Figure 2:
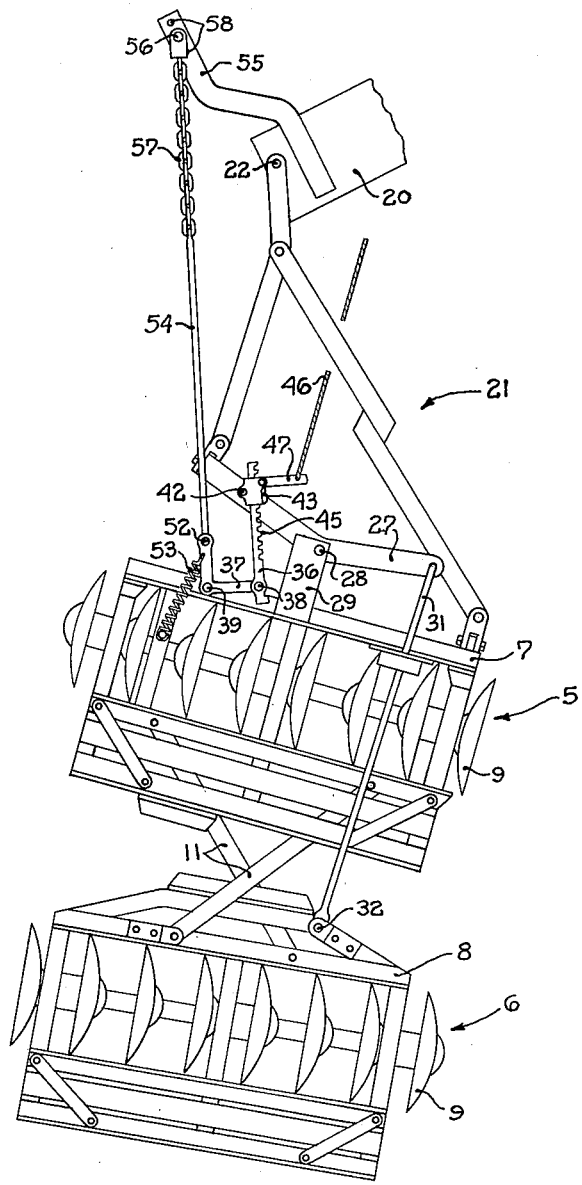

April 1, 1941.  R. H. MITCHELL  2,237,009
DISK HARROW
Original Filed May 5, 1936   2 Sheets-Sheet 1
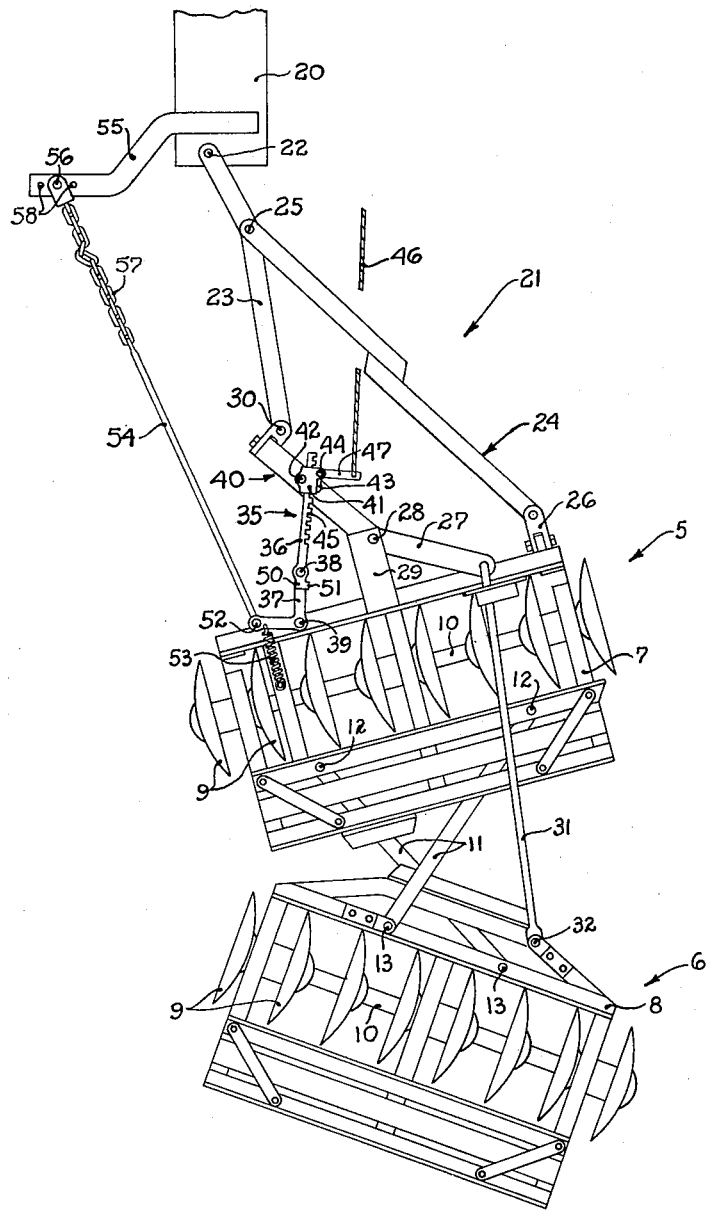
FIG-1
INVENTOR
ROLLIE H MITCHELL
BY
ATTORNEY Patented Apr. 1, 1941

2,237,009

UNITED STATES PATENT OFFICE 2,237,009

DISK HARROW

Rollie H. Mitchell, Huntington Park, Calif., assignor to Killefer Manufacturing Corporation, Los Angeles, Calif., a corporation of California Original application May 5, 1936, Serial No. 77,974, now Patent No. 2,169,471, dated August 15, 1939. Divided and this application July 17, 1939, Serial No. 284,828

18 Claims. (Cl. 55—83)

The present invention relates to disk harrows and more particularly to a control mechanism for controlling the operation of an offset tandem disk harrow such as is used for cultivating the ground in orchards. This application is a division of a co-pending application, Serial No. 77,974, filed May 5, 1936, now Patent No. 2,169,471, issued August 15, 1939, and has for its principal object the provision of locking mechanism for locking the two gangs of an offset disk harrow relative to each other and to the hitch in a predetermined angled position during normal operation, but which mechanism is automatically unlocked when the tractor is turned in the direction in which the disk gangs are spread apart, permitting the gangs to be moved out of their working angle, thus facilitating making the turn. A further and more specific object relates to the provision of an offset auxiliary draft connection between the tractor and the harrow, which is connected to the locking mechanism and is pulled forward during a turn of the tractor, first unlocking the locking mechanism and then transmitting draft force from the tractor to the harrow which tends to swing the gangs out of their working angle. A further object relates to the provision of a novel locking mechanism for the purposes mentioned above, employing toggle links which can be moved into and out of dead center locking position to lock and unlock the gangs.

These and other objects and advantages will be made apparent by a consideration of the following description, reference being had to the drawings appended hereto, in which—

Figure 1 is a plan view of an offset disk harrow shown in right-hand offset working position and embodying the principles of my invention; and Figure 2 is a plan view of the harrow shown in a right-hand turn.

Referring now to the drawings, the harrow comprises a front disk gang 5 and a rear disk gang 6, each of the gangs comprising a structural frame 7, 8, and a plurality of ground working disks 9 assembled in spaced relation on a gang bolt 10 journaled for rotation on each of the gang frames. The frames 7, 8 are connected together for angling movement on a horizontal plane by a pair of links 11, pivoted at laterally spaced points 12 on the rear of the front gang frame 7, and extending rearwardly in crossed relation to pivot points 13 on the front of the rear gang frame 8, as is well known in the art.

The harrow is propelled by a tractor or other draft means represented by the draft member 20, from which draft force is transmitted by a hitch 21, pivotally connected at 22 to the tractor 20 and connected to both gangs in a manner to be described. The hitch comprises a pair of hitch bars 23, 24, pivoted together at 25. The hitch bar 24 is adjustable in length to adjust the amount of offset of the harrow relative to the tractor in well known manner, and is connected by a universal joint 26 to the right front corner of the front gang frame. A transverse lever or bar 27 is pivoted intermediate of its ends at 28 to a bracket 29, fixed to the front gang frame 7. The hitch bar 23 is swingably connected to the left end of the lever 27 by a universal joint 30. The opposite end of the lever 27 is swingably connected to an angle control bar 31, which extends rearwardly and is pivoted at 32 to the right side of the rear gang frame 8.

The harrow gangs are pulled into working angle from a parallel relation by driving the tractor forwardly, by virtue of the draft force exerted forwardly upon the right front corner of the forward gang through the hitch bar 24, and also exerted through the hitch bar 23 to the lever 27, resulting in a rearward thrust through the angle control bar 31 to the right end of the rear gang frame 8.

The gangs can be locked together in any of several working angles by means of a locking device 35, comprising a pair of toggle links 36, 37, pivotally connected together at 38 in serial relation, one of the links 37 being pivoted to the front of the forward gang frame 7 at a point 39 near the left end thereof, the other link 36 being connected to the transverse lever 27, on the left side of the pivot 28, by means of an adjustable angle selector latch 40. The latch 40 comprises a tubular cage 41 adapted to slidably receive the link 36, and is pivoted at 42 on the lever 27. A latch dog 43 is pivoted at 44 on the cage 41 and is adapted to engage the teeth of a rack 45, formed on the link 36. Suitable spring means (not shown) are provided to normally hold the dog 43 in locking engagement with the rack 45, preventing relative sliding movement in either direction.

The latch dog is controlled from the tractor operator's station by means of a flexible control member, such as a rope 46, connected to an arm 47 fixed to the dog. When the rope is pulled, the dog is swung out of engagement with the rack 45, after which the gangs can be pulled into working angle by pulling the harrow forward, or straightened into a parallel or transport position by backing the tractor against the hitch. When the desired position is attained, the gangs can be locked therein by releasing the rope 46, allowing the dog 43 to reengage the rack 45.

The gangs are then locked in position against movement in either direction, the links being resistant against a compression force thereon by virtue of the dead center locked relation in which the links are normally disposed; that is to say, the pivot 38 between the links is aligned with the points 39, 42 at which the opposite ends of the links are connected to the lever 27 and gang frame 7, respectively. If so desired, the pivot 38 may be even slightly to the left (as viewed in the drawings) of a straight line connecting the pivots 39, 42, thereby locking the links more positively. The links are prevented from buckling in one direction by an extension arm 50 on one of the links 36, having a stop 51, which engages the other link 37 when the center pivot 38 is on or slightly over dead center. The links are free to swing or buckle in the opposite direction, however, in order to release the gangs from angularly locked position when it is desired to make a right turn.

To unlock the toggle device, a bell crank or arm 52 is provided on the rear link 37, and by a forward pull on the bell crank, the link 37, and hence the pivot 38 is swung toward the right until the locking effect of the toggle is overcome. A spring 53 is provided to normally hold the toggle links in locked position, and is connected between the bell crank 52 and a member of the front gang frame 7. The crank 52 is controlled by a member 54, connected thereto and extending forwardly to the tractor; the front end of the member being connected to a laterally extending arm 55 at a point 56 offset laterally from the hitch pivot 22. The arm 55 is fixed rigidly to the draft means 20 so that as the latter is turned to the right, as illustrated in Figure 2, the member 54 is pulled forwardly, thereby pulling the arm 52 forwardly about the pivot 39, first "breaking" the toggle lock and then exerting a draft force through the arm 52 upon the left end of the front gang frame 7, tending to pull the latter forwardly, with the result that the gangs are pulled out of their working angle into parallel relation, or even beyond the latter into oppositely angled relation, thus facilitating the right turn.

As soon as the draft means is straightened into forward movement in the new direction, the draft force is relieved from the auxiliary draft member 54, whereupon the gangs are pulled back into working angle by the draft force exerted upon the hitch 21, as previously described. The spring 53 returns the toggle links to locked position. In normal working position the flexible chain portion 57 of the auxiliary draft member 54 is slack. The amount of offset of the latter can be adjusted by connecting the forward end thereof to the offset arm 55 at any of a plurality of spaced holes 58.

I do not intend my invention to be limited to the precise details shown and described in this embodiment. Other locations of the toggle links will now be obvious to those skilled in the art, in which the gangs can be locked together in angled position and in which an offset draft connection will be effective to release the toggle locking device and then apply a force tending to swing the gangs out of angled position.

What I desire to protect by United States Letters Patent is set forth in the following claims.

I claim:

1. A disk harrow comprising a front disk gang, a rear disk gang, means interconnecting said gangs providing for relative angling movement of said gangs in a horizontal plane, hitch means connecting said front gang to a suitable draft means, a draft connection between said hitch means and said rear gang, means for locking said gangs in a predetermined position relative to each other, said locking means including a pair of toggle links connected between said gangs and disposed in dead center locking relation when the gangs are in said predetermined position, and control means by which said links can be moved out of said dead center locking relation to permit said gangs to be moved out of said predetermined position.

2. A disk harrow comprising a pair of disk gangs swingably connected together for angling movement in a horizontal plane, hitch means connected to one of said gangs and adapted to be connected to a tractor, an angle control bar connected between said hitch means and the other of said gangs, means for locking said gangs in angled position comprising a pair of serially connected toggle links, one of said links being connected to one of said gangs and the other link being connected with the other of said gangs, said links being normally disposed in substantially dead center locked position to restrain said gangs from moving out of said angled position, and a control member connected with said links for moving the latter out of said dead center position to permit said gangs to be moved out of said angled position.

3. In a disk harrow comprising a pair of disk gangs swingably connected together for angling movement in a horizontal plane and flexible hitch means connected to both gangs and adapted to be connected to a tractor, means for locking said gangs in angled position comprising a pair of serially connected toggle links, one of said links being connected to one of said gangs and the other link being connected with the other of said gangs, said links being normally disposed in substantially dead center locked position to restrain said gangs from moving out of said angled position, spring means for yieldably holding said links in locked position, and an auxiliary draft member adapted to be attached to said tractor and connected with said links for moving the latter out of said dead center position to permit said gangs to be moved out of said angled position when the tractor is turned in one direction.

4. In a disk harrow comprising a pair of disk gangs swingably connected together for angling movement in a horizontal plane and flexible hitch means connected to both gangs and adapted to be connected to a tractor, means for locking said gangs in angled position comprising a pair of serially connected toggle links, one of said links being connected to one of said gangs and the other link being connected with the other of said gangs, said links being normally disposed in substantially dead center locked position to restrain said gangs from moving out of said angled position, spring means for yieldably holding said links in locked position, and a flexible control member connected with one of said links and extending forwardly to the tractor, said links being movable out of said locked position responsive to a forward pull on said control member and thereby permitting said gangs to be moved out of said angled position.

5. In a disk harrow comprising a pair of disk gangs swingably connected together for angling movement in a horizontal plane and flexible hitch means connected to both gangs and adapted to be connected to a tractor, means for locking said gangs in angled position comprising a pair of serially connected toggle links, one of said links being connected to one of said gangs and the other link being connected with the other of said gangs, said links being normally disposed in substantially dead center locked position to restrain said gangs from moving out of said angled position, spring means for yieldably holding said links in locked position, a bell crank connected to one of said links, and a flexible control member attached to said bell crank and extending forwardly to the tractor, said links being movable out of said locked position responsive to a forward pull on said control member and thereby permitting said gangs to be moved out of said angled position.

6. In a disk harrow comprising front and rear disk gangs swingably connected together for angling movement in a horizontal plane, hitch means connected to said front gang and adapted to be connected to a tractor, an angle control bar connected between said hitch means and the other of said gangs, means for selectively locking said gangs in any of a plurality of angled positions relative to each other comprising a pair of serially connected toggle links, one of said links being connected to one of said gangs and adjustable means for selectively connecting the other of said links with the other of said gangs in any of said angled positions of the gangs, said links being normally disposed in dead center locked position to restrain said gangs from moving out of said angled position, and a control member connected with said links for moving the latter out of said dead center position to permit said gangs to be moved out of said angled position.

7. In a disk harrow comprising front and rear disk gangs swingably connected together for angling movement in a horizontal plane and flexible hitch means connected to said front gang and adapted to be connected to a tractor, an angle control bar connected between said hitch means and said rear gang, means for selectively locking said gangs in any of a plurality of angled positions relative to each other comprising a pair of serially connected toggle links, one of said links being connected to one of said gangs and means including an adjustable latch for selectively connecting the other of said links with the other of said gangs in any of said angled positions of the gangs, said latch being provided with a control member under control of the tractor operator, said links being adapted to normally restrain said gangs from moving out of angled position, and a control member connected with said links for unlocking the latter to permit the gangs to be moved out of said angled position.

8. In a disk harrow comprising front and rear disc gangs swingably connected together for angling movement in a horizontal plane and hitch means connected to both gangs and movable relative thereto and adapted to be connected to a tractor, means for locking said gangs in angled position comprising a pair of serially connected toggle links, one of said links being connected to one of said gangs and the other link being connected to said hitch means, said links being normally disposed in substantially dead center position to lock said gangs and said hitch means in a rigid unitary structure, and a control member connected with said links for moving the latter out of said dead center position to permit said gangs to be moved out of said angled position.

9. In a disk harrow comprising front and rear disk gangs swingably connected together for angling movement in a horizontal plane and flexible hitch means connected to both gangs and adapted to be connected to a tractor, means for selectively locking said gangs in any of a plurality of angled positions relative to each other comprising a pair of serially connected toggle links, one of said links being connected to one of said gangs and a latch device mounted on said hitch means and adapted to slidably receive the other of said links and to engage the latter in any of said angled positions of said gangs, said links being normally disposed in a substantially dead center position to lock said gangs and said hitch means together to restrain said gangs and said hitch member from relative angling movement, and a control member connected with said links for moving the latter out of said dead center position to permit said gangs to be moved out of said angled position.

10. In a disk harrow comprising a front disk gang, a rear disk gang, means swingably connecting said gangs together for angling movement in a horizontal plane, a transversely disposed lever pivotally mounted on one of said gangs, a connection from said lever to the other of said gangs, and a tractor hitch connected to said one gang and said lever, a pair of serially connected toggle links connected between said one gang and said lever and normally disposed in substantially dead center relation to restrain said gangs from moving relative to each other and to said hitch, and control means connected with said links for moving the latter out of said dead center relation to permit said gangs to be moved angularly.

11. In a disk harrow comprising a front disk gang, a rear disk gang, means swingably connecting said gangs together for angling movement in a horizontal plane, a transversely disposed lever pivotally mounted on one of said gangs, a connection from said lever to the other of said gangs, and a tractor hitch connected to said one gang and said lever, a pair of serially connected toggle links, one of said links being connected to one of said gangs and means including an adjustable latch for selectively connecting the other of said links with said lever in any of a plurality of angled positions of said gangs, said links being normally disposed in substantially dead center relation, and control means for moving the latter out of said dead center relation.

12. In a disk harrow comprising a front disk gang, a rear disk gang, means interconnecting said gangs providing for relative angling movement of said gangs in a horizontal plane, and hitch means for connecting said gangs to a suitable draft means, means for locking said gangs in a predetermined position relative to each other, said locking means including a pair of toggle links connected between said gangs and disposed in dead center locking relation when the gangs are in said predetermined position, and control means by which said links can be moved out of said dead center locking relation to permit said gangs to be moved out of said predetermined position, said control means comprising a connection to said locking means from a point on the draft means offset laterally from the point of connection of said hitch means thereto, and adapted to be actuated when the draft means is turned.

13. In a disk harrow comprising a pair of disk gangs swingably connected together for angling movement in a horizontal plane and flexible hitch means connected to both gangs and adapted to be connected to a tractor, means for locking said gangs in angled position comprising a pair of serially connected toggle links, one of said links being connected to one of said gangs and the other link being connected with the other of said gangs, said links being normally disposed in substantially dead center locked position to restrain said gangs from moving out of said angled position, and a control member connected with said links and adapted to be fastened to the tractor at a point offset from the point of connection of said hitch means thereto, whereby said links are moved out of said dead center relation by a force applied to said control member as the tractor is turned in one direction, thereby releasing said gangs for movement out of said angled position.

14. In a disk harrow comprising a pair of disk gangs swingably connected together for angling movement in a horizontal plane and flexible hitch means connected to both gangs and adapted to be connected to a tractor, means for locking said gangs in angled position comprising a pair of serially connected toggle links, one of said links being connected to one of said gangs and the other link being connected with the other of said gangs, said links being normally disposed in substantially dead center locked position to restrain said gangs from moving out of said angled position, and an auxiliary draft member connected with said links and adapted to be fastened to the tractor at a point offset from the point of connection of said hitch means thereto, said auxiliary draft member being pulled forwardly by virtue of its offset connection with the tractor as the latter is turned in one direction, thereby first moving said links out of said dead center position and transmitting a draft force from the tractor tending to swing said gangs out of said angled position.

15. In a disk harrow comprising a pair of disk gangs swingably connected together for angling movement in a horizontal plane and flexible hitch means connected to both gangs and adapted to be connected to a tractor, means for locking said gangs in angled position comprising a pair of serially connected toggle links, one of said links being connected to one of said gangs and the other link being connected with the other of said gangs, said links being normally disposed in substantially dead center locked position to restrain said gangs from moving out of said angled position, a bell crank connected to one of said links, and a flexible control member attached to said bell crank and extending forwardly to a point of connection with the tractor offset laterally from the point of connection of said hitch means thereto, whereby a forward pull on said control member is effected by turning the tractor in one direction, said links being movable out of said locked position responsive to such forward pull, thereby permitting said gangs to be moved out of said angled position.

16. In a disk harrow comprising a pair of disk gangs swingably connected together for angling movement in a horizontal plane and flexible hitch means connected to both gangs and adapted to be connected to a tractor, means for locking said gangs in angled position comprising a pair of serially connected toggle links, one of said links being connected to one of said gangs and the other link being connected with the other of said gangs, said links being normally disposed in substantially dead center locked position to restrain said gangs from moving out of said angled position, a bell crank connected to one of said links, and a flexible control member attached to said bell crank and extending forwardly to a point of connection with the tractor offset laterally from the point of connection of said hitch means thereto, whereby a forward pull on said control member is effected by turning the tractor in one direction, said links being movable out of said locked position responsive to such forward pull, thereby permitting said gangs to be moved out of said angled position, said forward pull then being transmitted through said bell crank to one of said gangs effectively to swing the gangs out of said angled position.

17. In a disk harrow comprising front and rear disk gangs swingably connected together for angling movement in a horizontal plane and flexible hitch means connected to both gangs and adapted to be connected to a tractor, means for selectively locking said gangs in any of a plurality of angled positions relative to each other comprising a pair of serially connected toggle links, one of said links being connected to one of said gangs and means including an adjustable latch for selectively connecting the other of said links with the other of said gangs in any of said angled positions of the gangs, said latch being provided with a control member under control of the tractor operator, said links being adapted to normally restrain said gangs from moving out of angled position, and a control member connected with said links and adapted to be fastened to the tractor at a point offset from the point of connection of said hitch means thereto, whereby said links are moved out of said dead center relation by a force applied to said control member as the tractor is turned in one direction, thereby releasing said gangs for movement out of said angled position.

18. In a disk harrow comprising front and rear disk gangs swingably connected together for angling movement in a horizontal plane and flexible hitch means connected to both gangs and adapted to be connected to a tractor, means for selectively locking said gangs in any of a plurality of angled positions relative to each other comprising a pair of serially connected toggle links, one of said links being connected to one of said gangs and means including an adjustable latch for selectively connecting the other of said links with the other of said gangs in any of said angled positions of the gangs, said latch being provided with a control member under control of the tractor operator, said links being adapted to normally restrain said gangs from moving out of angled position, and an auxiliary draft member connected with said links and adapted to be fastened to the tractor at a point offset from the point of connection of said hitch means thereto, said auxiliary draft member being pulled forwardly by virtue of its offset connection with the tractor as the latter is turned in one direction, thereby first moving said links out of said dead center position and transmitting a draft force from the tractor tending to swing said gangs out of said angled position.

ROLLIE H. MITCHELL.